(12) United States Patent
Dhir et al.

(10) Patent No.: US 6,957,283 B2
(45) Date of Patent: Oct. 18, 2005

(54) CONFIGURABLE COMMUNICATION INTEGRATED CIRCUIT

(75) Inventors: Amit Dhir, San Jose, CA (US); Krishna Rangasayee, Pleasanton, CA (US)

(73) Assignee: Xilinx, Inc., San Jose, CA (US)

( * ) Notice: Subject to any disclaimer, the term of this patent is extended or adjusted under 35 U.S.C. 154(b) by 869 days.

(21) Appl. No.: 09/915,707

(22) Filed: Jul. 25, 2001

(65) Prior Publication Data

US 2003/0023762 A1   Jan. 30, 2003

(51) Int. Cl.⁷ .............................................. G06F 3/00
(52) U.S. Cl. ........................ 710/10; 710/72; 709/221; 709/250; 716/16
(58) Field of Search ............... 709/220, 221, 709/250; 716/16; 710/10, 72

(56) References Cited

U.S. PATENT DOCUMENTS

| | | | |
|---|---|---|---|
| RE34,363 E * | 8/1993 | Freeman ..................... | 307/465 |
| 6,067,585 A * | 5/2000 | Hoang ......................... | 710/11 |
| 6,080,203 A * | 6/2000 | Njinda et al. .................. | 716/4 |
| 6,167,403 A * | 12/2000 | Whitmire et al. ............. | 707/10 |
| 6,243,756 B1 * | 6/2001 | Whitmire et al. ........... | 709/232 |
| 2002/0078249 A1 * | 6/2002 | Lu et al. ..................... | 709/310 |

OTHER PUBLICATIONS

Derfler and Freed; How Networks Work; 2000; Que; Millennium Edition, pag 59, 114 and 115.*

Amit Dhir; "Home Networking Using Phoneline Wiring"; Dedicated Systems Magazine; Apr. 15, 2001; pp. 52-57.
Amit Dhir; "Wireless Home Networks—DECT, Bluetooth, HomeRF, and Wireless LANs"; WP135, (v1.0) Mar. 21, 2001; available on-line at Xilinx.com; pp. 1-18.
Amit Dhir, Krishna Rangasayee; "FPGA Enabled Home Networking Technology Bridges—Connecting Disparate Technologies"; WP139 (v1.0) Mar. 21, 2001; available on-line at Xilinx.com; pp. 1-5.
Amit Dhir; "Introducing Xilinx and Programmable Logic Solutions for Home Networking"; WP129 (v1.0) Mar. 21, 20011 available on-line from Xilinx.com; pp. 1-21.
Carl Carmichael; Xilinx, XAPP216 (v1.0) entitled "Correcting Single-Event Upsets Through Virtex Partial Configuration"; Jun. 1,2000, available from Xilinx, Inc., 2100 Logic Drive, San Jose, California 95124; pp. 1-12.

* cited by examiner

Primary Examiner—Kim Huynh
Assistant Examiner—Alan Chen
(74) Attorney, Agent, or Firm—H. C. Chan; Kim Kanzaki

(57) ABSTRACT

The present invention is a programmable integrated circuit that can be used to handle different communication specifications. In one embodiment, the integrated circuit contains at least two physical layer modules, a media independent interface and a media access control module. The physical layer modules are preferably fixed logic components embedded in programmable logic fabric. In another embodiment, the integrated circuit contains a physical layer module and at least two media access control modules. The physical layer module is preferably a fixed logic component embedded in programmable logic fabric.

9 Claims, 5 Drawing Sheets

CONFIGURABLE COMMUNICATION INTEGRATED CIRCUIT

FIELD OF THE INVENTION

The present invention relates to programmable logic devices, and more particularly to programmable logic devices that incorporate communication components.

BACKGROUND OF THE INVENTION

Programmable logic devices exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic devices, called the field programmable gate array (FPGA), is very popular because of a superior combination of capacity, flexibility and cost. A FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory (e.g., an external PROM). The collective states of the individual memory cells then determine the function of the FPGA.

Even though FPGAs are very flexible and can be used to implement many circuits, they have some performance limitations, such as longer signal delays and lower gate counts. These limitations hinder the use of FPGAs on some high speed communication applications. This is because high speed communication circuits are very complex and require fast real-time processing of information. For these applications, application specific integrated circuits (ASICs) are generally used.

Unfortunately, communication circuits implemented as ASICs have several disadvantages. One such disadvantage is the time-to-market risks associated with the relatively long cycle time necessary for the implementation of a new ASIC design. An additional disadvantage of using ASICs for communication circuits is that ASICs are "hardwired" and must be redesigned for any new application.

In view of the foregoing, it is advantageous and therefore desirable to have available a programmable logic device which is capable of implementing complex and high speed communication circuits.

SUMMARY OF THE INVENTION

The present invention is a programmable integrated circuit that can be used to handle different communication specifications. In one embodiment, the integrated circuit contains at least a first and a second physical layer module each can interact with a physical medium under a predetermined specification. The integrated circuit also contains a media independent interface that can receive a first set of data from either one of the first and the second physical layer modules and generate a second set of data. A media access control module in the integrated circuit is used to processes the second set of data. The media independent interface and the media access control module are preferably implemented using a programmable logic fabric and the first and the second physical layer modules are preferably fixed logic components embedded in the programmable logic fabric.

In another embodiment, the integrated circuit contains a physical layer module that can interact with a physical medium under a predetermined specification. The integrated circuit also contains at least a first and a second media access control module that can receive and process data from the physical layer module. The first and the second media access control modules are preferably implemented using a programmable logic fabric and the physical layer module is preferably a fixed logic component embedded in the programmable logic fabric.

BRIEF DESCRIPTION OF THE DRAWINGS

The present invention is illustrated by way of example, and not by way of limitation, in the detailed description and the following figures, in which like reference numerals refer to similar elements.

DETAILED DESCRIPTION OF THE INVENTION

The present invention relates to implementing a communication system using a programmable integrated circuit. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
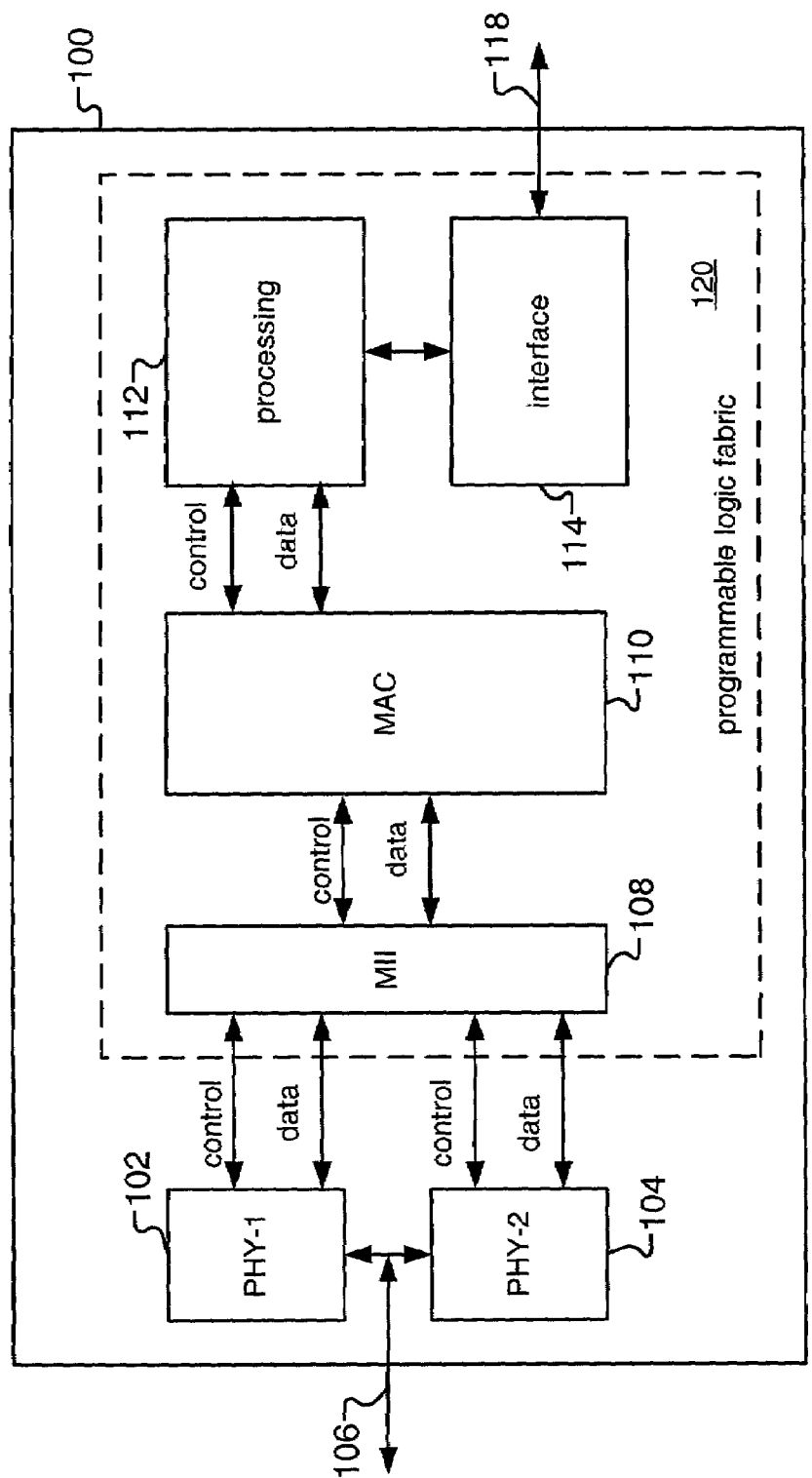
FIG. 1 is a block diagram of a communication integrated circuit of the present invention.

FIG. 1 is a block diagram of a communication integrated circuit 100 of the present invention. Integrated circuit 100 contains two physical layer (PHY) components (102 and 104) that are connected to a signal line 106. Signal line 106 provides a communication link between integrated circuit 100 and external data of a physical medium. Each PHY communicates with a media independent interface (MII) component 108 through a control and a data line. MII 108 is connected to a media access control (MAC) component 110. MAC 110 is connected to processing component 112, which is in turn connected to an interface component 114. Interface component 114 is connected to a signal line 118. Signal line 118 is connected to an external device (not shown), such as a universal serial bus (USB) compatible device.

In integration circuit 100, signal lines 106 and 118 are bi-directional lines receiving data from and delivering data to external sources. In the present invention, the data on signal line 106 conforms to a predetermined specification. One example is the HomePNA 2.0 specification, which is supported by the Home Phoneline Networking Alliance. This specification provides for data communication using regular telephone lines. Another example is the 10 Mbps Ethernet (IEEE 802.3) specification, which is supported by International Electrical and Electronic Engineers (IEEE). This specification provides for data communication between a plurality of devices on shared wires. A PHY interacts with a physical medium that conforms to one of these specifications. MII component 108 provides a common interface specification so that different PHYs can easily communicate with other components in integrated circuit 100. MAC component 110 is concerned with media access issues, such as whether token passing or contention will be used. It typically includes authentication and encryption functionalities. The MAC is a sub-layer of the "data link control," which is defined by the IEEE as the lower portion of the OSI reference model data link layer. The data to and from the MAC is processed by processing component 112. For example, processing component 112 is used to implement higher layers of the reference model. Interface component 114 provides the physical signal and software drivers for integrated circuit 100 to interact with an external device in accordance with a predetermined protocol (such as USB and IEEE 1394).

In one embodiment of integrated circuit 100, PHY 102 and 104 are fixed logic components embedded into a programmable logic fabric 120. Fixed logic components allow high speed processing of data. This is useful for implementing the physical layers because they need to process tremendous amount of raw data in and out of the physical medium. The rest of the components (i.e., MII 108, MAC 110, processing component 112, and interface component 114) are preferably implemented using a programmable logic fabric 120. One advantage is that any change in specifications of these components can be implemented easily in the environment of a programmable logic fabric.

In this embodiment, two PHY components and one MAC components are present in integrated circuit 100 (but note that more than two PHY components may be present if there is a need to do so). Each of the PHY components is able to process data in accordance with a predetermined protocol. For example, PHY 102 may conform to the HomePNA 2.0 specification while PHY 104 may confirm to the 10 Mbps Ethernet (IEEE 802.3) specification. It is observed that these two specifications define a MAC that is substantially the same. This observation is especially important in an implementation using field programmable gate array (FPGA). This is because FPGA allows a small portion of its programmable fabric to be changed without affecting the rest of the programmable fabric. This process is called "partial reconfiguration." An example of partial reconfiguration is disclosed in an application note published in June, 2000, by Xilinx, Inc., the assignee of the present invention, as "Correcting Single-Event Upsets Through Virtex Partial Configuration." As a result, the portion of MAC that is common to both specifications does not need to be changed after configuration. Only a small portion specific to each specification needs to be changed when integrated circuit 100 is switched from HomePNA to Ethernet. Alternatively, the specific portions of both specifications are placed in integrated circuit 100. The appropriate portion is used after a specification is selected (e.g., by setting a switch). Because the size of each specific portion is small, this method will not use too much resource of the integrated circuit.

Figure 2:
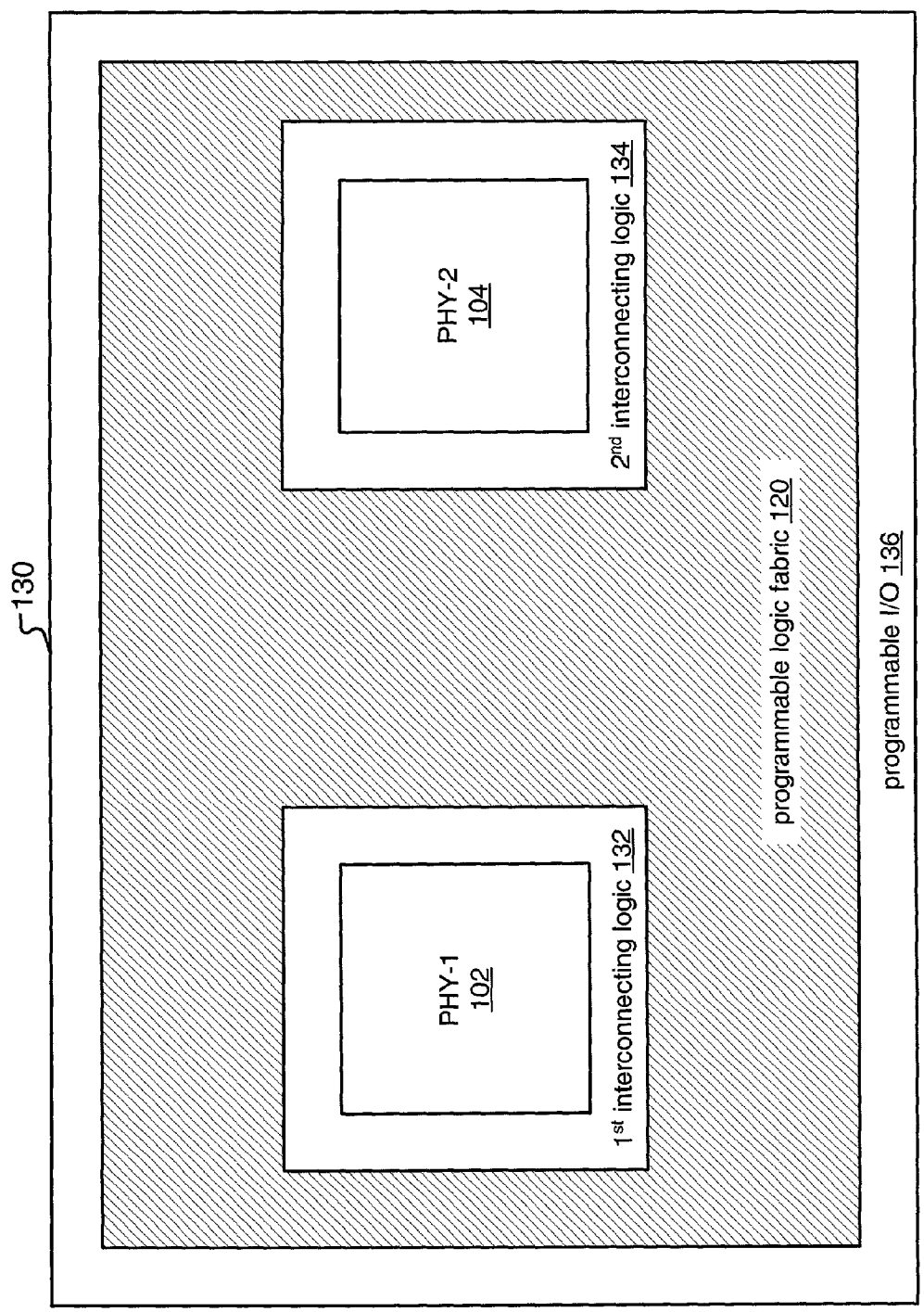
FIG. 2 is a block diagram of a FPGA that can be used to implement the communication integrated circuit of FIG. 1.

Implementation details of integrated circuit 100 using a FPGA 130 are shown in FIG. 2. Common elements in FIGS. 1 and 2 have common reference numerals. In this exemplary implementation, PHYs 102 and 104 are spaced apart so that a common programmable logic fabric can be used to implement MII 108 and MAC 110. As mentioned before, PHYs 102 and 104 are fixed logic components (i.e., not implemented using programmable logic fabric elements). A connection logic layer (such as first connection logic layer 132 and second connection logic layer 134) is used to provide transition from a fixed logic component to the programmable logic fabric. FPGA 130 also has a plurality of programmable IOBs 136. Some of these IOBs can be used to carry signals 106 and 118 of FIG. 1.

Figure 3:
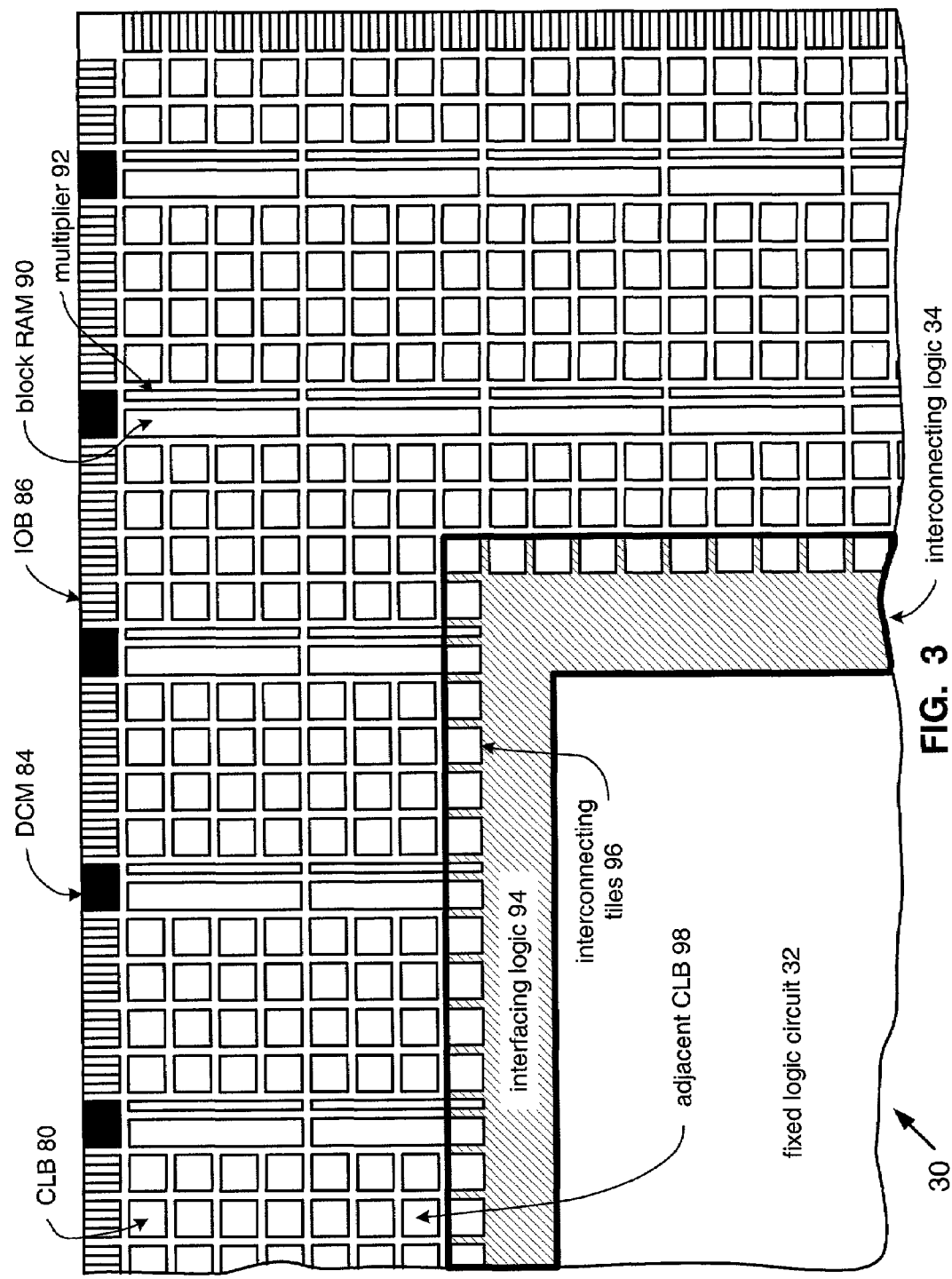
FIG. 3 is a schematic diagram of a portion of a FPGA containing a PHY component, programmable logic fabric, and the connection logic of the present invention.

A detailed description of one of the connection logic layers is now provided. FIG. 3 shows one section 30 of integrated circuit 100. As shown in FIG. 3, a programmable logic fabric 12 includes a plurality of CLBs 80, a plurality of memory blocks (block RAM) 90, and a plurality of multipliers 92. Programmable I/O block section 14 includes a plurality of individual IOBs 86 and a plurality of digital clock managers (DCM) 84. The operations of CLBs 80, DCMs 84, IOBs 86, block RAM 90, and multipliers 92 function in a similar manner as corresponding components found in the X4000E family of field programmable gate arrays and/or the Virtex-II field programmable gate arrays designed and manufactured by Xilinx, Inc.

As shown, CLBs 80, block RAM 90 and multipliers 92 are arranged in a series of rows and columns. To embed a fixed logic circuit 32, programmable logic fabric 12 of CLBs 80, block RAM 90, and multipliers is essentially cut to make a hole for the insertion of the fixed logic circuit and its corresponding interconnecting logic 34. As such, fixed logic circuit 32 and interconnecting logic 34 replace a set of configurable logic blocks 80, a set of memory blocks 90, and/or a set of multipliers 92.

With a hole cut in the programmable logic fabric, typical operation of the FPGA would be interrupted. This interruption occurs as a result of a programming interdependency between the plurality of configurable logic blocks 80, block RAMs 90, and multipliers 92.

The interconnecting logic 34 includes a plurality of interconnecting tiles 96 and may further include interfacing logic 94. The interconnecting tiles 96 provide connectivity between the interfacing logic 94, when included, and fixed logic circuit 32 with the plurality of CLBs 80, block RAM's 90 and/or multipliers 92 of the programmable logic fabric 12.

Interfacing logic 94 conditions data transfers between fixed logic 32 and CLBs 80, block RAM 90 and/or multipliers 92 of the programmable logic fabric. Such conditioning is dependent upon the functionality of fixed logic circuit 32. For example, if fixed logic circuit 32 processes video and/or audio signals in the analog domain, interfacing logic 94 would include analog to digital converters and digital to analog converters. If fixed logic circuit 32 is a microprocessor, the interfacing logic conditions the data to access control buses, address buses, and/or data buses of the microprocessor. In addition, interfacing logic 94 may include test circuitry for testing the embedded fixed logic circuit and the surrounding programmable logic fabric.

A different architecture of a communication integrated circuit 200 is now described. Integrated circuit 200 contains one PHY component 202 connected to a signal line 206. Signal line 206 provides a communication link between integrated circuit 200 and external data of a physical medium. PHY component 202 is connected to two MAC components 204 and 206. When integrated circuit is in operation, only one MAC is used. MAC 204 and 206 are connected to a processing component 212, which is in turn connected to an interface component 214. Interface component 214 is connected to signal line 218, which is connected to an external device (not shown).

In this architecture, MAC components 204 and 206 have very little in common. Thus, the above mentioned partial reconfiguration may not present much advantages in this case. Consequently, both MAC components are pre-installed in integrated circuit 200.

In this embodiment, PHY components 202 is preferably a fixed logic component embedded into a programmable logic fabric. The other components, such as the MAC components 204 and 206, processing component 212, and interface component 214, can be implemented using programmable logic fabric 220. It should be noted that any number of MACs can be installed in integrated circuit 200, depending on the its size.

Figure 4:
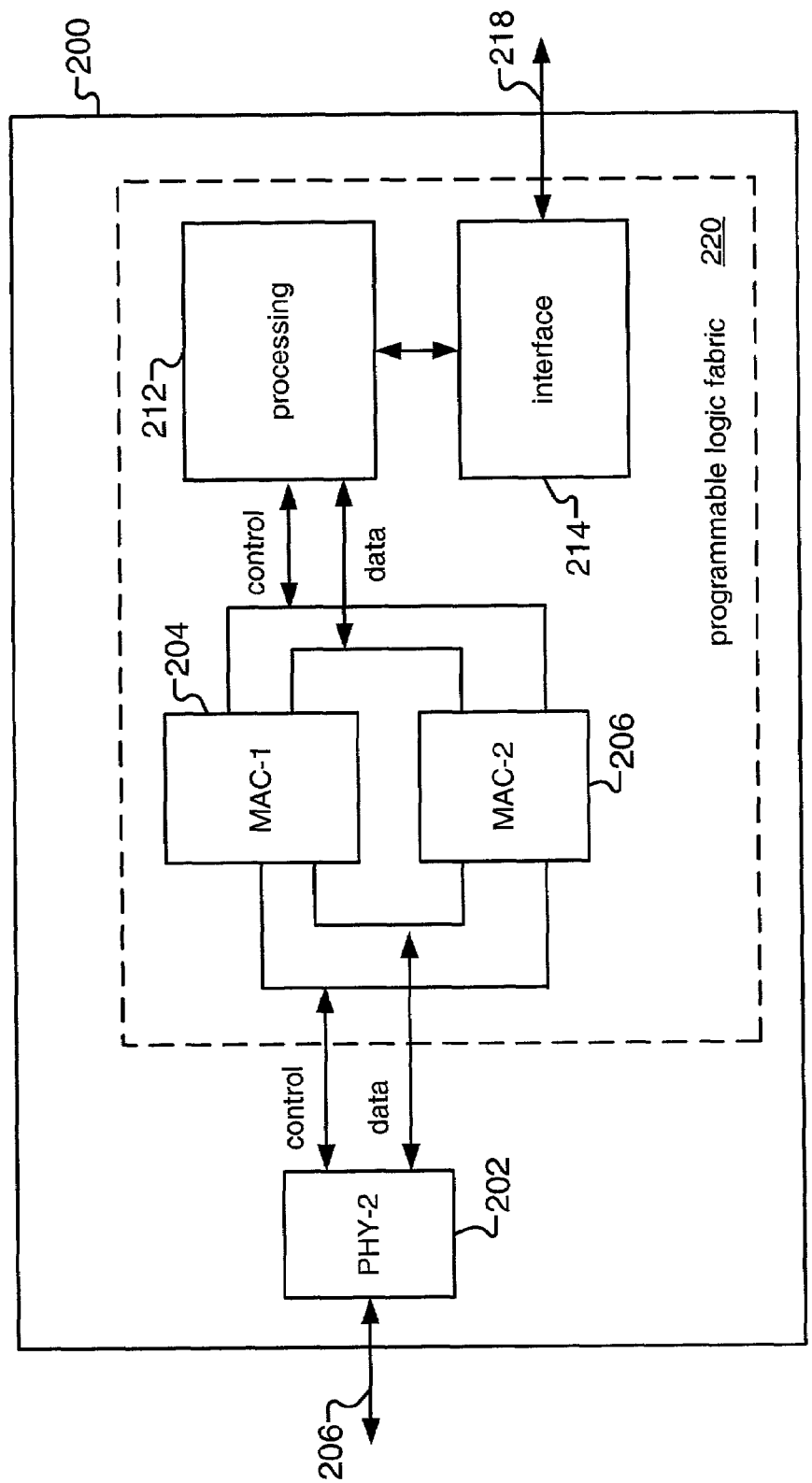
FIG. 4 is a block diagram of another communication integrated circuit of the present invention.
Figure 5:
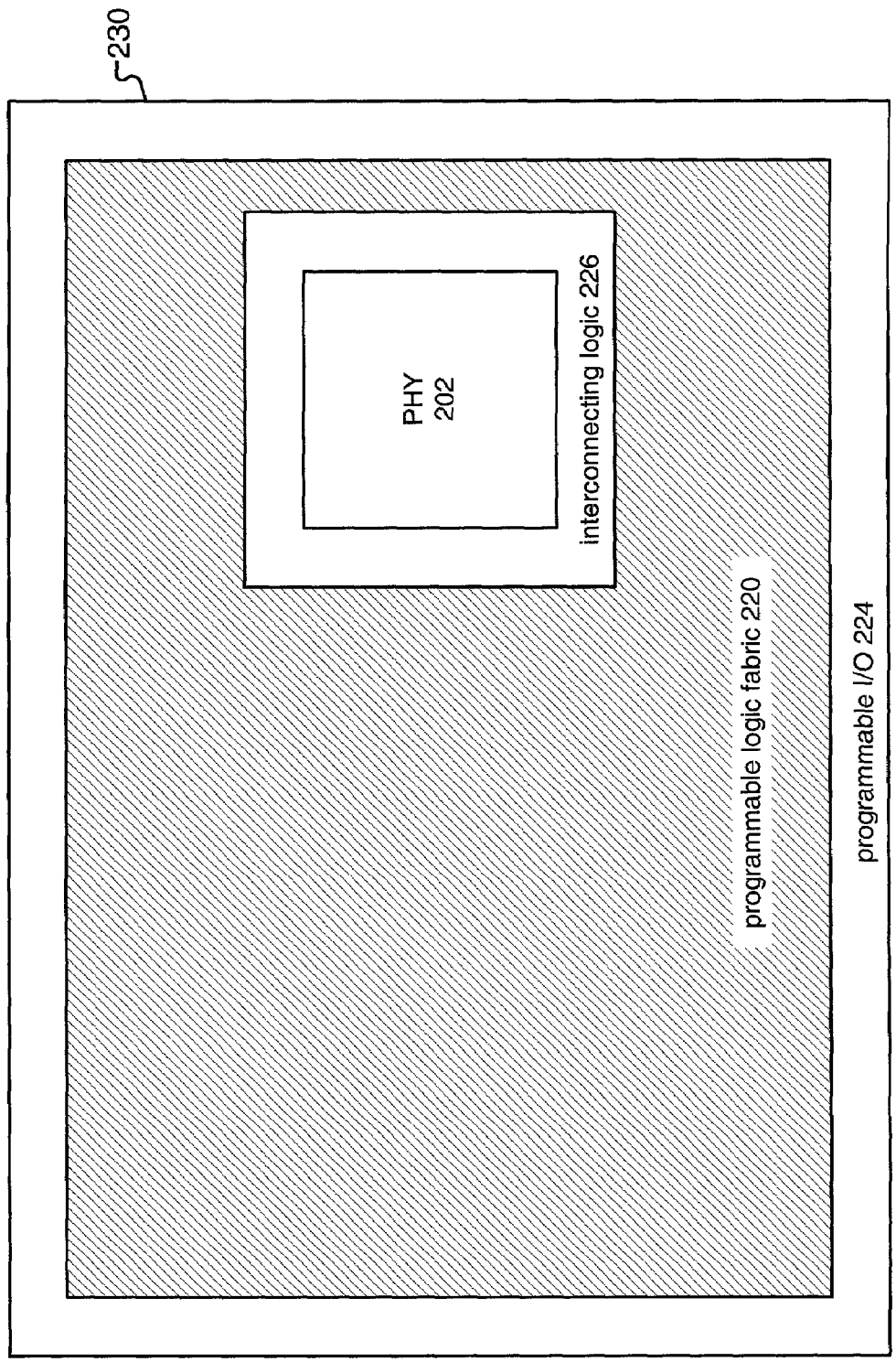
FIG. 5 is a block diagram of a FPGA that can be used to implement the communication circuit of FIG. 4.

FIG. 5 shows a FPGA 230 that can be used to implement integrated circuit 200 of FIG. 4. Common elements of FIGS. 4 and 5 shares common reference numerals. PHY 202 is placed inside programmable logic fabric 220. A connection logic layer 226 is used to provide transition from a fixed logic component to the programmable logic fabric. FPGA 230 also has a plurality of programmable IOBs 224. Some of the IOBs are used to carry signals 206 and 218 of FIG. 4.

Examples of specifications that can advantageously use the architecture shown in FIG. 4 are HiperLAN2, supported by HiperLAN2 Global Forum and IEEE 802.11a, supported by IEEE. These are wireless local area network specifications.

It can be seen from the above description that a novel communication system architecture have been disclosed. Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

What is claimed is:

1. A programmable logic integrated circuit used in a communication system, comprising:
at least a first and a second physical layer module each can interact with a physical medium under a predetermined specification;
a media independent interface that can receive a first set of data from either one of the first and the second physical layer modules and generate a second set of data; and
a media access control module that processes the second set of data; and
wherein the media access control module comprises a first portion and a second portion, and wherein the first portion remains unchanged after configuration and the second portion is partial reconfigurable in response to a selection of either the first or the second physical layer module.

2. The integrated circuit of claim 1 wherein the media independent interface and the media access control module are implemented using a programmable logic fabric and the first and the second physical layer modules are fixed logic components embedded in the programmable logic fabric.

3. The integrated circuit of claim 2 further comprising an interconnect logic layer separating the fixed logic components from the programmable logic fabric.

4. The integrated circuit of claim 3 wherein the interconnect logic layer comprises interconnecting tiles.

5. The integrated circuit of claim 1 wherein the predetermined specification is home phoneline networking specification.

6. The integrated circuit of claim 1 wherein the predetermined specification is Ethernet specification.

7. An integrated circuit comprising:
a plurality of configurable logic blocks connected together via a programmable interconnect structure;
at least a first and a second physical layer module each can interact with a physical medium under a specification;
a media independent interface that can receive a first set of data from either one of the first and the second physical layer modules and generate a second set of data; and
a media access control module that processes the second set of data; and
wherein the media access control module comprises a first portion and a second portion, and wherein the first portion remains unchanged after configuration and the second portion is partial reconfigurable in response to a selection of either the first or the second physical layer module.

8. The integrated circuit of claim 7 wherein the specfication is HiperLAN2 wireless local area specification.

9. The integrated circuit of claim 7 wherein the specification is IEEE 802.11a wireless local area network specification.

* * * * *